(12) United States Patent
Yoshida et al.

(10) Patent No.: US 10,781,923 B2
(45) Date of Patent: Sep. 22, 2020

(54) COVER, SEAL FITTING DEVICE, AND SEAL FITTING METHOD

(71) Applicant: FANUC CORPORATION, Yamanashi (JP)

(72) Inventors: Hirosato Yoshida, Yamanashi-ken (JP); Nobuyuki Ootake, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 16/362,973

(22) Filed: Mar. 25, 2019

(65) Prior Publication Data

US 2019/0301610 A1 Oct. 3, 2019

(30) Foreign Application Priority Data

Mar. 27, 2018 (JP) .................................. 2018-059805

(51) Int. Cl.
*F16J 15/10* (2006.01)
*F16J 15/06* (2006.01)
*G01D 5/26* (2006.01)

(52) U.S. Cl.
CPC ............. *F16J 15/10* (2013.01); *F16J 15/062* (2013.01); *G01D 5/26* (2013.01)

(58) Field of Classification Search
CPC ............. F16J 15/10; F16J 15/062; G01D 5/26
See application file for complete search history.

(56) References Cited

U.S. PATENT DOCUMENTS

2015/0008651 A1* 1/2015 Koyama .................. F16J 15/10
277/641

FOREIGN PATENT DOCUMENTS

| DE | 202010008107 U1 | 10/2010 | |
|---|---|---|---|
| EP | 1648025 A1 * | 4/2006 | ....... H01L 21/67763 |
| JP | 2006-108257 A | 4/2006 | |
| JP | 2009142934 A | 7/2009 | |
| JP | 2009291859 A | 12/2009 | |
| JP | 2017061015 A | 3/2017 | |
| JP | 2017155874 A | 9/2017 | |

OTHER PUBLICATIONS

Notice of Reasons for Refusal issued by the Japanese Patent Office in relation to Japanese Application No. 2018-059805 dated Dec. 17, 2019 (2 pages) along with English language translation (2 pages).
Decision to Grant a Patent issued by the Japanese Patent Office in relation to Japanese Application No. 2018-059805 dated Mar. 3, 2020 (3 pages) along with English language translation (2 pages).

* cited by examiner

*Primary Examiner* — Gilbert Y Lee
(74) *Attorney, Agent, or Firm* — Robert P. Michal, Esq.; Carter, DeLuca & Farrell LLP (57) ABSTRACT

A cover having a container portion whose one end is opened and whose other end is closed by a bottom surface, includes: an annular groove formed into an annular shape along an outer circumference of an opening of the container portion; a plurality of communicating portions that are formed in a side wall partitioning the annular groove and the container portion so as to connect the annular groove and the container portion in a radial direction; and an annular seal member fitted to the annular groove.

4 Claims, 10 Drawing Sheets

COVER, SEAL FITTING DEVICE, AND SEAL FITTING METHOD

CROSS-REFERENCE TO RELATED APPLICATION

This application is based upon and claims the benefit of priority from Japanese Patent Application No. 2018-059805 filed on Mar. 27, 2018, the contents of which are incorporated herein by reference.

BACKGROUND OF THE INVENTION

Field of the Invention

The present invention relates to a cover having an annular groove to which a seal member is fitted, a seal fitting device for fitting the seal member to the annular groove of the cover, and a seal fitting method for fitting the seal member to the annular groove of the cover by using the seal fitting device.

Description of the Related Art

Japanese Laid-Open Patent Publication No. 2006-108257 discloses an implement in which an interposing member is fitted in a groove formed in a container portion.

SUMMARY OF THE INVENTION

It is difficult to fit an interposing member (seal member) in a groove (annular groove) by using a robot or the like. This is hampering automation of the process of fitting an interposing member to a groove.

The present invention has been made in order to solve the problem above, and an object of the present invention is to provide a cover in which a seal member can easily be fitted to an annular groove formed in the cover, a seal fitting device, and a seal fitting method.

According to a first aspect of the present invention, a cover having a container portion whose one end is opened and whose other end is closed by a bottom surface, includes: an annular groove formed into an annular shape along an outer circumference of an opening of the container portion; a plurality of communicating portions that are formed in a side wall partitioning the annular groove and the container portion so as to connect the annular groove and the container portion in a radial direction; and an annular seal member fitted to the annular groove.

According to a second aspect of the present invention, a seal fitting device includes a cover having a container portion whose one end is opened and whose other end is closed by a bottom surface, and a jig configured to fit a seal member to the cover. The cover includes: an annular groove formed into an annular shape along an outer circumference of an opening of the container portion; and a plurality of communicating portions that are formed in a side wall partitioning the annular groove and the container portion so as to connect the annular groove and the container portion in a radial direction. The jig includes: an insertion portion formed along a shape of a side surface of the container portion; and a plurality of seal attaching portions formed on an outer circumferential surface of the insertion portion and protruding at positions respectively corresponding to the communicating portions. The seal member is attached to an outer circumference of the seal attaching portions.

According to a third aspect of the present invention, a seal fitting method for fitting a seal member to an annular groove by using the above-described seal fitting device may include: a seal member attaching step of attaching the seal member to an outer circumference of the seal attaching portions; a fitting step of, in a state in which the communicating portions and the seal attaching portions are aligned in position with each other, inserting the insertion portion into the container portion to a position where the seal member is inserted in the annular groove; and a pulling off step of pulling the insertion portion off from the container portion.

According to the present invention, it is possible to easily fit the seal member to the annular groove formed in the cover.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Embodiment

[Structure of Rotary Encoder]

Figure 1:
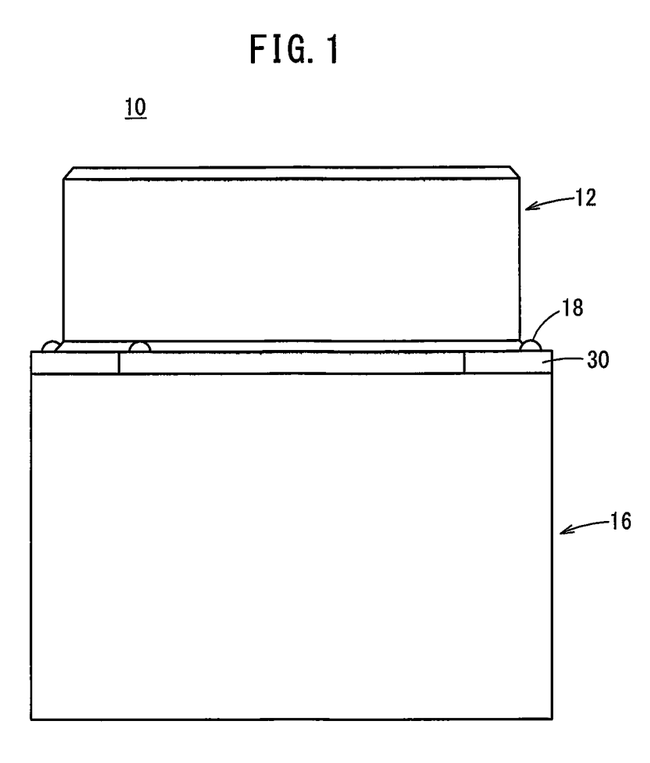
FIG. 1 is a side view of a rotary encoder.
Figure 2:
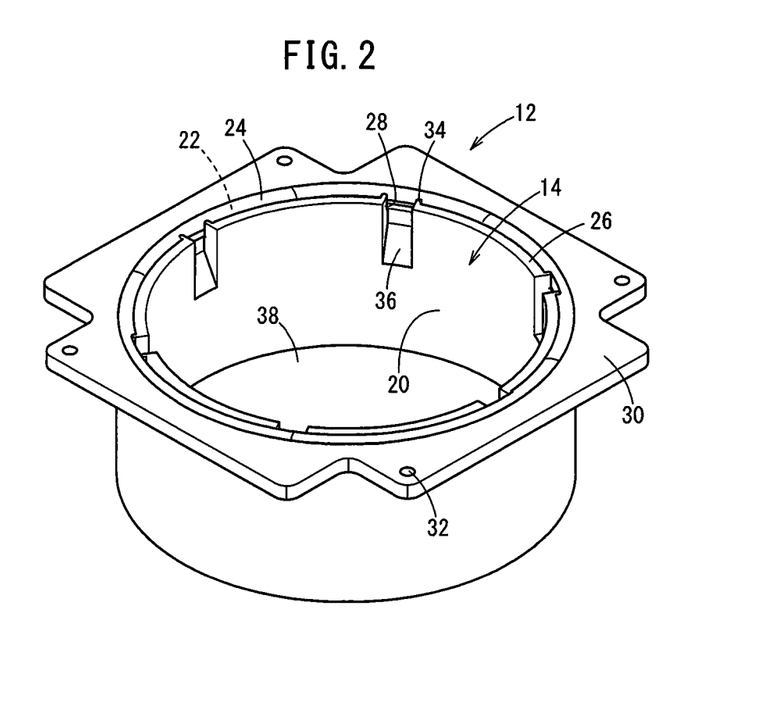
FIG. 2 is a perspective view of a cover.
Figure 3:
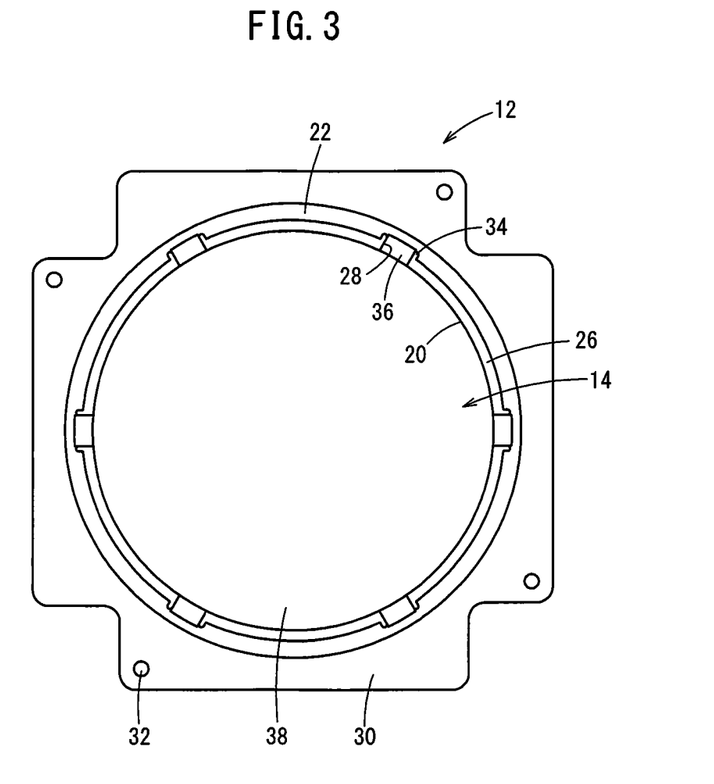
FIG. 3 is a diagram showing the cover seen from a side on which its container portion opens.

FIG. 1 is a side view of a rotary encoder 10. FIG. 2 is a perspective view of a cover 12. FIG. 3 is a diagram showing the cover 12 seen from a side on which its container portion 14 opens. FIG. 2 shows the cover 12 with a seal member 24 fitted thereto, and FIG. 3 shows the cover 12 without the seal member 24 fitted thereto.

The rotary encoder 10 has a metal housing 16 and the cover 12 made of resin. The cover 12 is fixed to the housing 16 by screws 18. The cover 12 has a container portion 14 formed into a bottomed cup shape. The container portion 14 has a side surface 20 formed into a cylindrical shape. A non-illustrated rotary code board, light emitting device, light receiving device, and the like are accommodated in the container portion 14. In the following description of the cover 12, with the cover 12 being seen, as shown in FIG. 3, from the side on which the container portion 14 opens, the radial direction of the container portion 14 is referred to simply as a radial direction, and the circumferential direction of the container portion 14 is referred to simply as a circumferential direction.

On the side of the cover 12 on which the container portion 14 opens, an annular groove 22 is formed into an annular shape along the outer circumference of the container portion 14. The annular groove 22 has a circular shape when the cover 12 is seen from the side on which the container portion 14 opens. The seal member 24 is fitted to the annular groove 22. The seal member 24 is an annular member made of an elastic material.

A side wall 26 that partitions the annular groove 22 and the container portion 14 has formed therein communicating portions 28 that allow the annular groove 22 and the container portion 14 to communicate with each other in the radial direction. In this embodiment, the communicating portions 28 are formed at six positions in such a manner that adjacent communicating portions 28 are spaced from each other. A width of the communicating portions 28 in the circumferential direction is set to be not greater than twice the diameter of a cross section of the seal member 24, more preferably to be less than twice, in a state in which the seal member 24 is fitted in the annular groove 22.

A flange 30 is formed on the outer circumferential side of the annular groove 22. The flange 30 has four screw holes 32 formed therein, into which the screws 18 are inserted.

Figure 4:
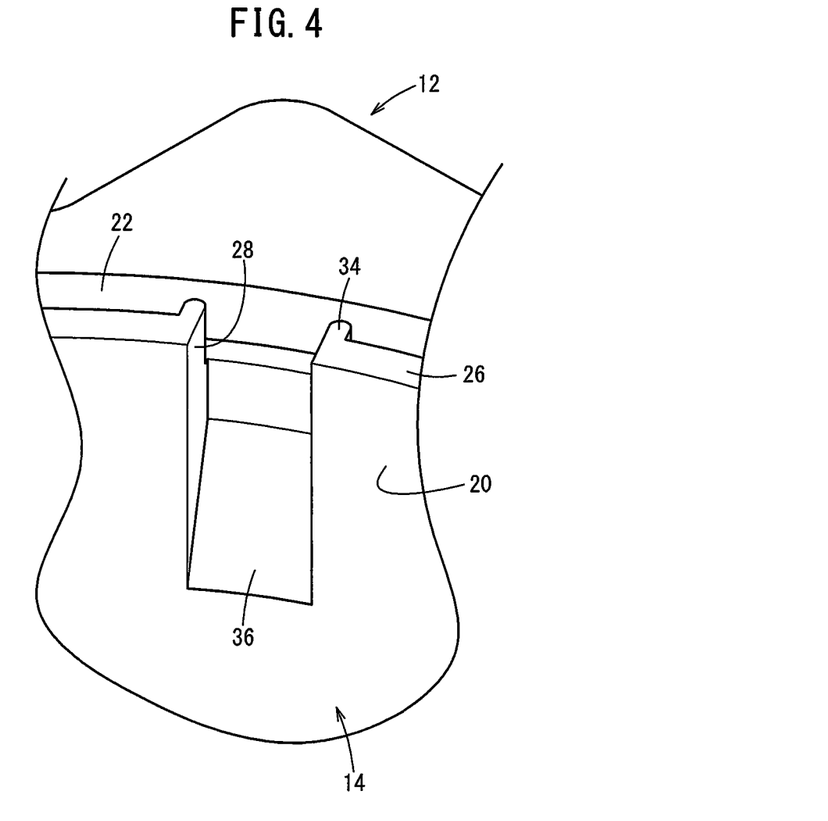
FIG. 4 is an enlarged perspective view showing a communicating portion of the cover and its vicinity.
Figure 5:
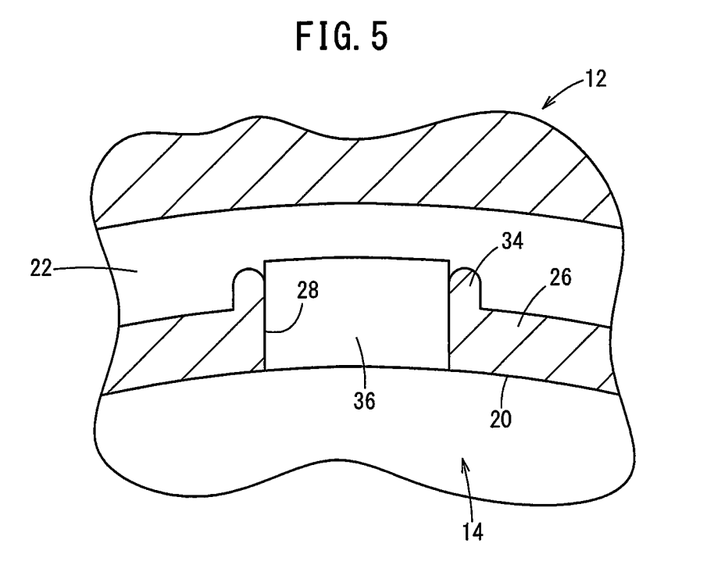
FIG. 5 is an enlarged sectional view of the communicating portion of the cover and its vicinity.

FIG. 4 is an enlarged perspective view showing a communicating portion 28 and its vicinity of the cover 12. FIG. 5 is an enlarged cross sectional view showing the communicating portion 28 and its vicinity of the cover 12. The side wall 26 has projections 34 formed so as to protrude radially outwardly (into the annular groove 22). The projections 34 are formed at 12 positions such that a communicating portion 28 is interposed between two projections 34 in the circumferential direction. The projections 34 are formed in the vicinities of the communicating portions 28 in the circumferential direction, where a distance between the projection 34 and communicating portion 28 in the circumferential direction is not greater than a fourth of a distance between adjacent two communicating portions 28 in the circumferential direction. The projections 34 may be formed adjacent to the communicating portions 28 in the circumferential direction.

The side surface 20 of the container portion 14 has engagement grooves 36 formed by recessing portions of the side surface 20. Each engagement groove 36 is contiguous to the communicating portion 28 and formed at positions closer to the bottom surface 38 of the container portion 14 than the communicating portions 28 are. The engagement grooves 36 are formed such that their depth in the radial direction becomes shallower toward the bottom surface 38. As shown in FIG. 5, the engagement groove 36 partially overlaps the annular groove 22 when the cover 12 is seen from the side on which the container portion 14 opens. At the bottom surface of the annular groove 22, the engagement groove 36 is formed such that the radially outward position of the engagement groove 36 is located radially more outward than the radially outward position of the projections 34.

[Structure of Jig]

Figure 6:
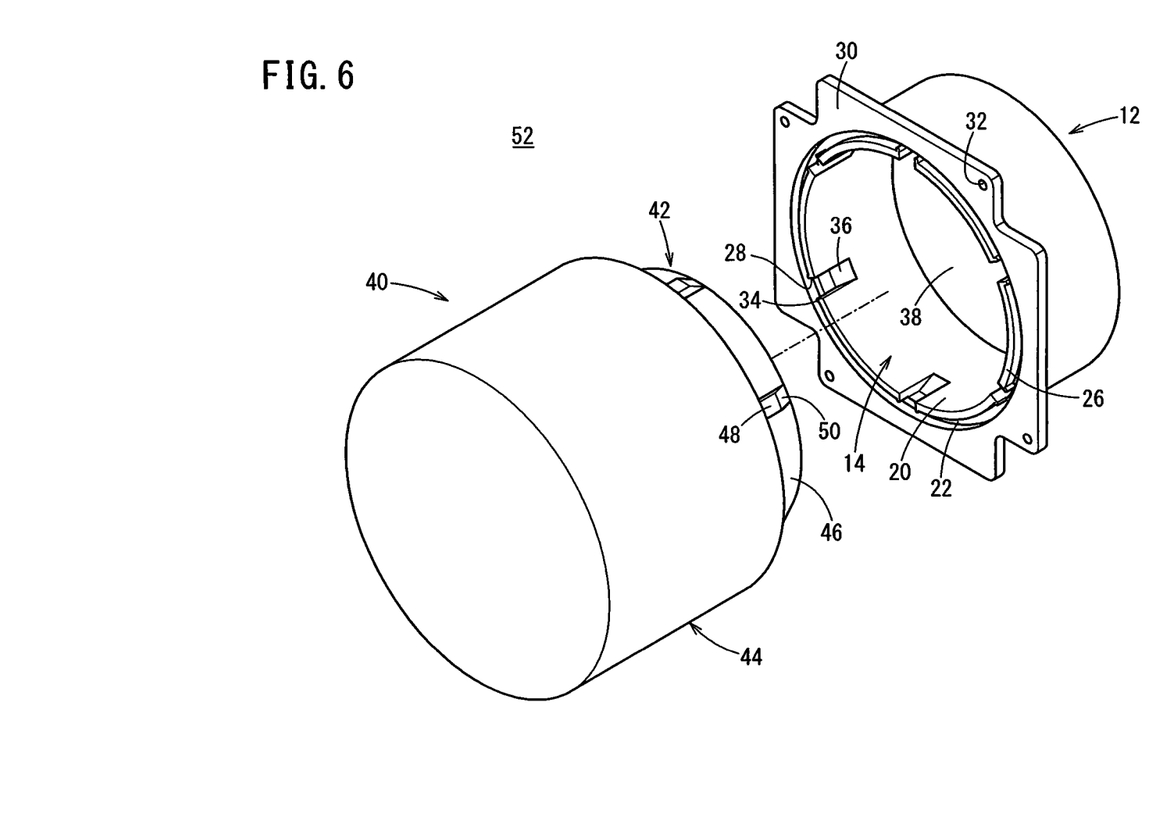
FIG. 6 is a perspective view of the cover and a jig.
Figure 7:
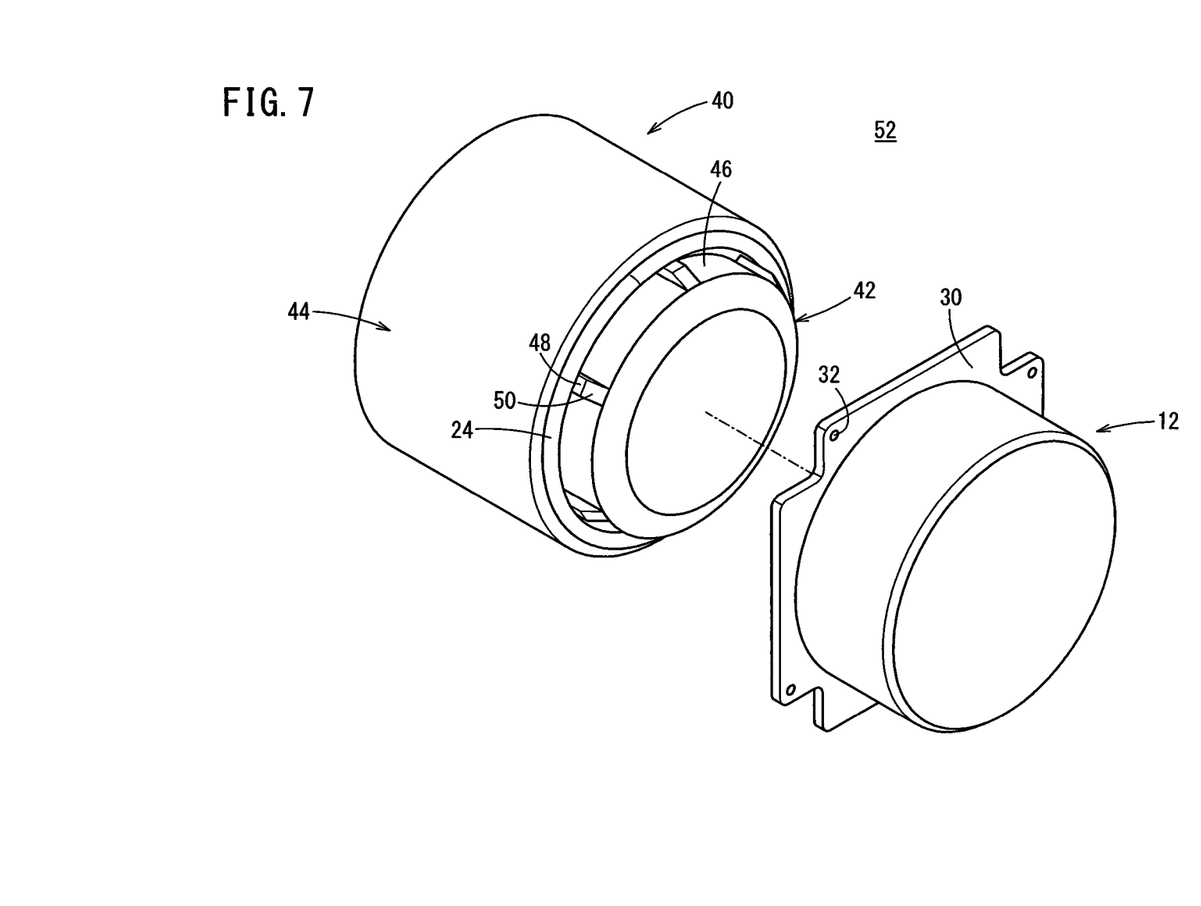
FIG. 7 is a perspective view of the cover and jig.
Figure 8:
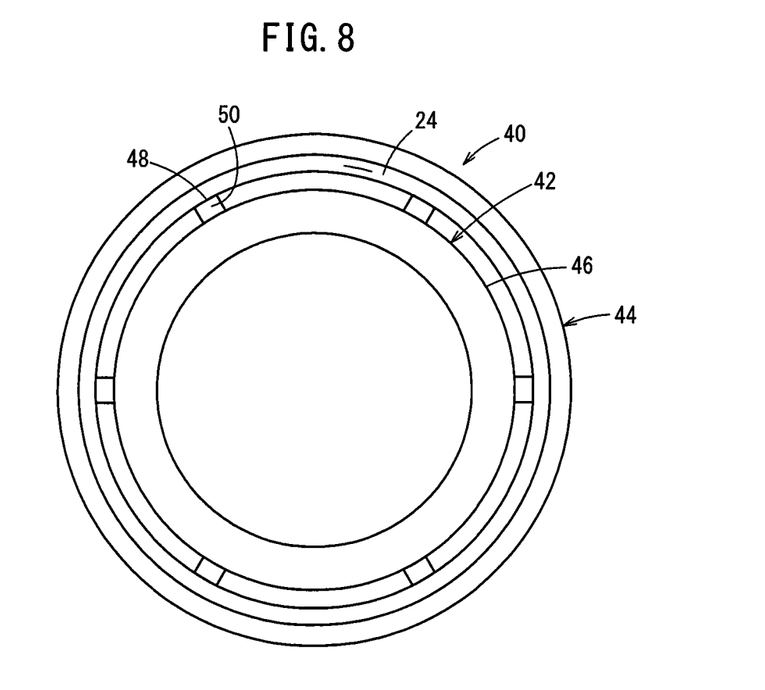
FIG. 8 is a diagram showing the jig seen from a side of its insertion portion.
Figure 9:
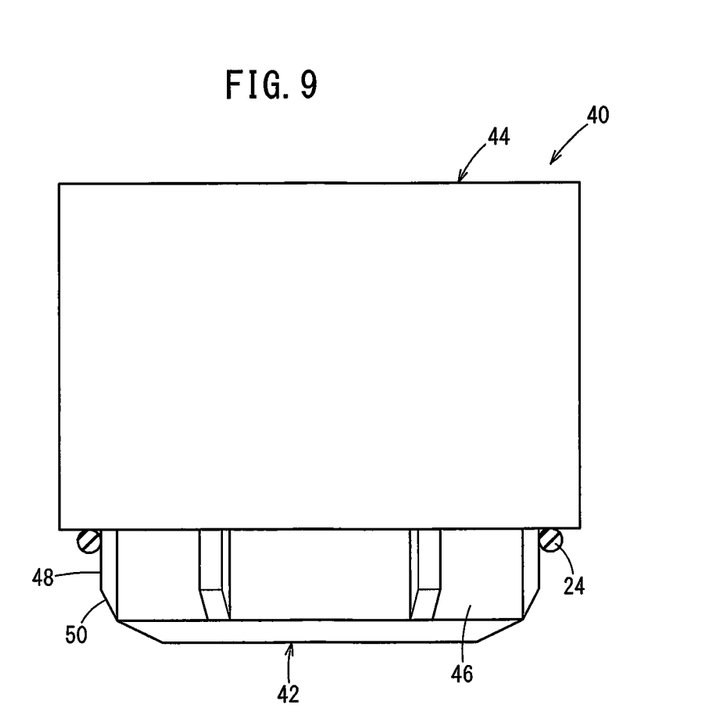
FIG. 9 is a side view of the jig.

In this embodiment, the seal member 24 is fitted to the annular groove 22 of the cover 12 using a jig 40. The jig 40 is attached to a robot (not shown) as an end effector. FIGS. 6 and 7 are perspective views of the cover 12 and jig 40. FIG. 8 is a diagram showing the jig 40 seen from a side of its insertion portion 42. FIG. 9 is a side view of the jig 40. FIG. 9 shows the jig 40 with the seal member 24 attached thereto, where the seal member 24 is shown in cross section. The jig 40 and the cover 12 form a seal fitting device 52.

The jig 40 has the insertion portion 42 formed so as to extend in the axial direction from its shaft 44. The insertion portion 42 has an outer circumferential surface 46 formed into a cylindrical shape along the shape of the side surface 20 of the container portion 14 of the cover 12. In the description of the jig 40 below, when as shown in FIG. 8 the jig 40 is seen from the side of the insertion portion 42, the radial direction of the insertion portion 42 is referred to simply as a radial direction, and the circumferential direction of the insertion portion 42 is referred to simply as a circumferential direction.

Figure 10:
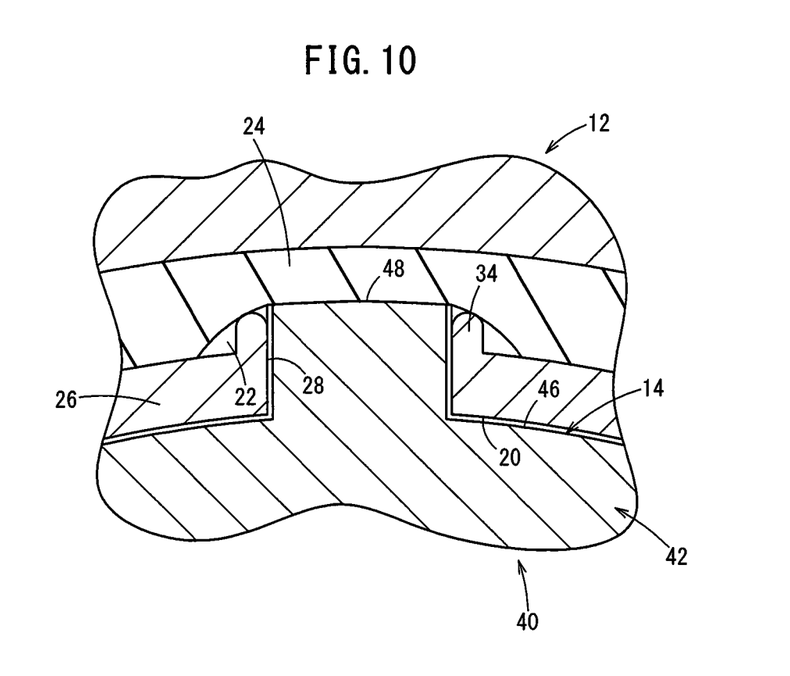
FIG. 10 is an enlarged sectional view showing the communicating portion and its vicinity where the insertion portion of the jig is inserted in the container portion of the cover.

The outer circumferential surface 46 of the insertion portion 42 has seal attaching portions 48 formed so as to protrude radially outwardly at positions corresponding to the communicating portions 28 of the cover 12. When fitting the seal member 24 to the annular groove 22 of the cover 12 by using the jig 40, the seal member 24 is attached to the outer circumference of the seal attaching portions 48. FIG. 10 is an enlarged cross sectional view of the communicating portion 28 and its vicinity where the insertion portion 42 of the jig 40 is inserted in the container portion 14 of the cover 12. The seal attaching portions 48 are shaped such that the radially outward position of the seal attaching portions 48 is located radially more outward than the radially outward position of the projections 34.

Guide portions 50 are formed on the outer circumferential surface 46 of the insertion portion 42. Each guide portion 50 is contiguous to the seal attaching portion 48 on a side of the seal attaching portion 48 that is closer to the distal end of the insertion portion 42. As shown in FIG. 9, the guide portions 50 are formed such that their height in the radial direction becomes lower toward the distal end of the insertion portion 42.

[Method of Fitting Seal Member]

When fitting the seal member 24 to the annular groove 22 of the cover 12, the insertion portion 42 of the jig 40 is first inserted in the inner circumference of the seal member 24 so as to attach the seal member 24 on the outer circumference of the seal attaching portions 48. The attachment of the seal member 24 to the jig 40 may be performed automatically by a robot, or may be performed by hand by a human operator.

Next, with the positions of the communicating portions 28 of the cover 12 aligned with the positions of the seal attaching portions 48 of the jig 40, the insertion portion 42 is inserted into the container portion 14 to such a position that the seal member 24 attached to the jig 40 is inserted in the annular groove 22 of the cover 12. Next, the insertion portion 42 of the jig 40 is pulled out of the container portion 14 of the cover 12.

In the state in which the seal member 24 is attached to the outer circumference of the seal attaching portions 48 of the jig 40, portions of the seal member 24 between adjacent two seal attaching portions 48 bend radially inwardly. When the insertion portion 42 has been inserted in the container portion 14 to such a position that the seal member 24 is inserted in the annular groove 22 of the cover 12, the seal member 24 comes in contact with the side wall 26 of the annular groove 22. The area of the portions of the seal member 24 that are in contact with the side wall 26 is larger than the area of the portions of the seal member 24 that are in contact with the seal attaching portions 48. Accordingly, the frictional force between the seal member 24 and the side wall 26 is larger than the frictional force between the seal member 24 and the seal attaching portions 48. Therefore, when the insertion portion 42 of the jig 40 is pulled out of the container portion 14 of the cover 12, the seal member 24 is left on the annular groove 22 side.

[Functions and Effects]

The shape of the seal member 24 is not stable because it is made of an elastic material. Therefore, it has been difficult to fit the seal member 24 to the annular groove 22 of the cover 12 by using a robot or the like. Consequently, the process of fitting the seal member 24 to the annular groove 22 has been performed by hand in many cases. Further, a high success rate is not achieved when the seal member 24 is fitted to the annular groove 22 by a robot or the like. The process of fitting the seal member 24 to the annular groove 22 has hence been time consuming.

In this embodiment, the cover 12 has the plurality of communicating portions 28 that are formed in the side wall 26 partitioning the annular groove 22 and the container portion 14 such that the communicating portions 28 communicate with (connect) the annular groove 22 and the container portion 14 in the radial direction. Further, the jig 40 employed to fit the seal member 24 to the annular groove 22 of the cover 12 has the plurality of seal attaching portions 48 formed on the outer circumferential surface 46 of the insertion portion 42 that is inserted in the container portion 14 of the cover 12, and the plurality of seal attaching portions 48 protrude at the positions corresponding to the communicating portions 28 of the cover 12.

The operation of the jig 40 for fitting the seal member 24 to the annular groove 22 of the cover 12 only includes a step of inserting the insertion portion 42 of the jig 40 into the container portion 14 of the cover 12 and a step of pulling the insertion portion 42 off from the container portion 14. Thus, the seal member 24 can be easily fitted to the annular groove 22 of the cover 12 by using a robot or the like.

Further, in this embodiment, the width of the communicating portions 28 of the cover 12 in the circumferential direction is not greater than twice the diameter of the seal member 24. This prevents the seal member 24 fitted in the annular groove 22 of the cover 12 from protruding from the communicating portions 28.

Still further, in this embodiment, the cover 12 has the projections 34 formed on the side wall 26. The projections 34 are formed so as to protrude toward the inside of the annular groove 22 at positions spaced at a certain distance or less from the communicating portion 28 in the circumferential direction. Also, when the insertion portion 42 of the jig 40 is inserted in the container portion 14 of the cover 12 and the seal attaching portions 48 of the jig 40 are engaged into the communicating portions 28 of the cover 12, the seal attaching portions 48 are positioned more outward than the projections 34.

The provision of the projections 34 in the annular groove 22 prevents the seal member 24 fitted in the annular groove 22 from falling off from the annular groove 22. Further, if the seal member 24 is caught on the projections 34 when fitting the seal member 24 to the annular groove 22, it would be difficult to insert the seal member 24 into the annular groove 22. In this embodiment, the seal attaching portions 48 of the jig 40 are positioned on a more outer circumference side than the projections 34, so that the seal member 24 can be easily inserted into the annular groove 22 when fitting the seal member 24 to the annular groove 22.

Furthermore, in this embodiment, the length of the insertion portion 42 of the jig 40 in the axial direction is longer than the diameter of the seal member 24, and the length of the seal attaching portions 48 is also longer than the diameter of the seal member 24. This prevents the seal member 24 attached to the outer circumference of the seal attaching portions 48 from falling off from the jig 40.

Still further, in this embodiment, the guide portions 50 are formed contiguous with the seal attaching portions 48 on a distal end side of the insertion portion 42 of the jig 40. The formation of the guide portions 50 on the distal end side of the insertion portion 42 makes it easy to insert the insertion portion 42 into the container portion 14 with the positions of the seal attaching portions 48 of the jig 40 and the positions of the communicating portions 28 of the cover 12 coinciding with each other.

Still further, in this embodiment, the guide portions 50 formed on the distal end side of the insertion portion 42 of the jig 40 are formed such that their height from the outer circumferential surface 46 of the insertion portion 42 in the radial direction becomes lower toward the distal end of the insertion portion 42. Further, the engagement grooves 36 that are formed in the side surface 20 of the container portion 14 of the cover 12 and into which the guide portions 50 are engaged are formed such that their depth in the radial direction becomes shallower toward the bottom surface 38 of the container portion 14. This suppresses lowering of the strength of the cover 12 that would be caused by the formation of the engagement grooves 36 in the side surface 20 of the container portion 14.

The description above has been given concerning the cover 12 of the rotary encoder 10, but it can be a cover that is attached to other equipment. The shape of the container portion 14 need not necessarily be cylindrical, and the shape of the annular groove 22 need not necessarily be circular.

[Technical Ideas Obtained by Embodiment]

Technical ideas that can be grasped from the above-described embodiment will be described below.

The cover (12) having a container portion (14) whose one end is opened and whose other end is closed by a bottom surface (38), includes: an annular groove (22) formed into an annular shape along an outer circumference of an opening of the container portion (14); a plurality of communicating portions (28) that are formed in a side wall (26) partitioning the annular groove (22) and the container portion (14) so as to connect the annular groove (22) and the container portion (14) in a radial direction; and an annular seal member (24) fitted to the annular groove (22). Thus, it is possible to easily fit the seal member (24) to the annular groove (22) of the cover (12) by using a robot or the like.

In the cover (12) above, the communicating portions (28) may have a width in a circumferential direction that is not greater than twice a diameter of the seal member (24). This prevents the seal member (24) fitted in the annular groove (22) of the cover (12) from protruding from the communicating portions (28).

In the cover (12) above, the side wall (26) may have projections (34) that are located at positions adjacent respectively to the communicating portions (28) in a circumferential direction or at positions spaced respectively from the communicating portions (28) by a certain distance or less in the circumferential direction, the projections being formed to protrude toward an inside of the annular groove (22). This prevents the seal member (24) fitted in the annular groove (22) from falling off from the annular groove (22).

The cover (12) above may further include engagement grooves (36) that are formed in a side surface (20) of the container portion (14) at positions closer to the bottom surface (38) than the communicating portions (28) are, the engagement grooves (36) being contiguous respectively to the communicating portions (28) and formed so that their depth in the radial direction becomes shallower in a direction toward the bottom surface (38). This reduces lowering of the strength of the cover (12) that would be caused by the formation of the engagement grooves (36) in the side surface (20) of the container portion (14).

The seal fitting device (52) includes a cover (12) having a container portion (14) whose one end is opened and whose other end is closed by a bottom surface (38), and a jig (40) configured to fit a seal member (24) to the cover (12). The cover (12) includes: an annular groove (22) formed into an annular shape along an outer circumference of an opening of the container portion (14); and a plurality of communicating portions (28) that are formed in a side wall (26) partitioning the annular groove (22) and the container portion (14) so as to connect the annular groove (22) and the container portion (14) in a radial direction. The jig (40) includes: an insertion portion (42) formed along a shape of a side surface (20) of the container portion (14); and a plurality of seal attaching portions (48) formed on an outer circumferential surface (46) of the insertion portion (42) and protruding at positions respectively corresponding to the communicating portions (28). The seal member (24) is attached to an outer circumference of the seal attaching portions (48). It is thus possible to easily fit the seal member (24) to the annular groove (22) of the cover (12) by using a robot or the like.

In the seal fitting device (52) above, the cover (12) may further have projections (34) that are formed on the side wall (26) at positions adjacent respectively to the communicating portions (28) in a circumferential direction or at positions spaced respectively from the communicating portions (28) by a certain distance or less in the circumferential direction, the projections protruding toward an inside of the annular groove (22). In a state in which the insertion portion (42) is inserted in the container portion (14) and the seal attaching portions (48) are engaged respectively into the communicating portions (28), the seal attaching portions (48) may be positioned on a more outer circumferential side than the projections (34). Thus, when fitting the seal member (24) to the annular groove (22), the seal member (24) can be easily inserted in the annular groove (22).

In the seal fitting device (52) above, the cover (12) may further include engagement grooves (36) that are formed in the side surface (20) of the container portion (14) at positions closer to the bottom surface (38) than the communicating portions (28) are, the engagement grooves (36) being contiguous respectively to the communicating portions (28) and formed so that their depth in the radial direction becomes shallower in a direction toward the bottom surface (38). The jig (40) may further include guide portions (50) that are formed on the outer circumferential surface (46) of the insertion portion (42) at positions on a more distal end side of the insertion portion (42) than the seal attaching portions (48) so that the guide portions (50) are contiguous respectively to the seal attaching portions (48), the guide portions (50) being formed so that their height in the radial direction from the outer circumferential surface (46) of the insertion portion (42) becomes lower toward a distal end of the insertion portion (42). This reduces lowering of the strength of the cover (12) that would be caused by the formation of the engagement grooves (36) in the side surface (20) of the container portion (14).

A seal fitting method for fitting the seal member (24) to the annular groove (22) by using the above-described seal fitting device (52), includes: a seal member attaching step of attaching the seal member (24) to the outer circumference of the seal attaching portions (48); a fitting step of, in a state in which the communicating portions (28) and the seal attaching portions (48) are aligned in position with each other, inserting the insertion portion (42) into the container portion (14) to a position where the seal member (24) is inserted in the annular groove (22); and a pulling off step of pulling the insertion portion (42) off from the container portion (14). It is thus possible to easily fit the seal member (24) to the annular groove (22) of the cover (12) by using a robot or the like.

While the invention has been particularly shown and described with reference to the preferred embodiments, it will be understood that variations and modifications can be effected thereto by those skilled in the art without departing from the scope of the invention as defined by the appended claims.

What is claimed is:

1. A seal fitting device comprising:
   a cover comprising a container portion whose one end is opened and whose other end is closed by a bottom surface; and
   a jig configured to fit a seal member to the cover,
   the cover comprising:
   an annular groove formed into an annular shape along an outer circumference of an opening of the container portion; and
   a plurality of communicating portions that are formed in a side wall partitioning the annular groove and the container portion so as to connect the annular groove and the container portion in a radial direction,
   the jig comprising:
   an insertion portion formed along a shape of a side surface of the container portion; and
   a plurality of seal attaching portions formed on an outer circumferential surface of the insertion portion and protruding at positions respectively corresponding to the communicating portions,
   wherein the seal member is attached to an outer circumference of the seal attaching portions.

2. The seal fitting device according to claim 1, wherein the cover further comprises projections that are formed on the side wall at positions adjacent respectively to the communicating portions in a circumferential direction or at positions spaced respectively from the communicating portions by a certain distance or less in the circumferential direction, the projections protruding toward an inside of the annular groove, and
   in a state in which the insertion portion is inserted in the container portion and the seal attaching portions are engaged respectively into the communicating portions, the seal attaching portions are positioned on a more outer circumferential side than the projections.

3. The seal fitting device according to claim 1, wherein the cover further comprises engagement grooves that are formed in the side surface of the container portion at positions closer to the bottom surface than the communicating portions are, the engagement grooves being contiguous respectively to the communicating portions and formed so that their depth in the radial direction becomes shallower in a direction toward the bottom surface, and
   the jig further comprises guide portions that are formed on the outer circumferential surface of the insertion portion at positions on a more distal end side of the insertion portion than the seal attaching portions so that the guide portions are contiguous respectively to the seal attaching portions, the guide portions being formed so that their height in the radial direction from the outer circumferential surface of the insertion portion becomes lower toward a distal end of the insertion portion.

4. A seal fitting method for fitting a seal member to an annular groove by using the seal fitting device according to claim 1, the seal fitting method comprising:
- a seal member attaching step of attaching the seal member to an outer circumference of the seal attaching portions;
- a fitting step of, in a state in which the communicating portions and the seal attaching portions are aligned in position with each other, inserting the insertion portion into the container portion to a position where the seal member is inserted in the annular groove; and
- a pulling off step of pulling the insertion portion off from the container portion.

\* \* \* \* \*